(12) United States Patent
Hirose et al.

(10) Patent No.: US 9,840,304 B2
(45) Date of Patent: Dec. 12, 2017

(54) HYDRAULIC BRAKE ACTUATION DEVICE

(75) Inventors: Kazuyuki Hirose, Osaka (JP); Shinichi Takizawa, Osaka (JP)

(73) Assignee: Shimano Inc., Osaka (JP)

( * ) Notice: Subject to any disclaimer, the term of this patent is extended or adjusted under 35 U.S.C. 154(b) by 1990 days.

(21) Appl. No.: 13/039,456

(22) Filed: Mar. 3, 2011

(65) Prior Publication Data

US 2012/0222416 A1    Sep. 6, 2012

(51) Int. Cl.
| | | |
|---|---|---|
| B60T 7/02 | (2006.01) | |
| B62L 3/02 | (2006.01) | |
| F15B 7/08 | (2006.01) | |
| B60L 1/02 | (2006.01) | |

(52) U.S. Cl.
CPC .............. B62L 3/023 (2013.01); B60L 1/02 (2013.01); F15B 7/08 (2013.01)

(58) Field of Classification Search
USPC ............. 188/26; 60/594, 553, 584, 533, 588
See application file for complete search history.

(56) References Cited

U.S. PATENT DOCUMENTS

| | | |
|---|---|---|
| 7,487,638 B2 | 2/2009 | Tetsuka et al. |
| 7,516,616 B2 | 4/2009 | Tetsuka et al. |
| 7,540,147 B2 | 6/2009 | Takizawa et al. |
| 7,628,014 B2* | 12/2009 | Weiher ............................. 60/594 |
| 2007/0284203 A1* | 12/2007 | Tetsuka et al. ............... 188/344 |
| 2010/0218636 A1 | 9/2010 | Wen |

FOREIGN PATENT DOCUMENTS

| | | |
|---|---|---|
| DE | 602 05 573 T2 | 6/2006 |
| DE | 602006000952 T2 | 5/2009 |
| EP | 1992557 A2 | 11/2008 |

* cited by examiner

*Primary Examiner* — Michael Leslie
*Assistant Examiner* — Daniel Collins
(74) *Attorney, Agent, or Firm* — Global IP Counselors, LLP (57) ABSTRACT

A hydraulic brake actuation device is provided that basically includes a housing, a master piston, a push rod, an actuation lever, a contact member and a support member. The housing includes a master cylinder. The master piston is slidably disposed in the master cylinder. The push rod is coupled to the master piston. The actuation lever is pivotally attached to the housing. The contact member contacts the actuation lever. The contact member also contacts the push rod that pushes the master piston. The support member is attached to the housing. The support member is a separate piece from the housing that guides the contact member.

11 Claims, 9 Drawing Sheets

HYDRAULIC BRAKE ACTUATION DEVICE

BACKGROUND

Field of the Invention

This invention generally relates to a hydraulic brake actuation device. More specifically, the present invention relates to a hydraulic brake actuation device with a support member that guides contact member of a push rod.

Background Information

In recent years, bicycles have been provided with hydraulic braking systems. A hydraulic brake system typically includes a hydraulic brake actuation device, a rotor attached to one of the bicycle wheels and a brake caliper having a slot that receives the rotor therein. The brake caliper has two brake pads that selectively contact the rotor in response to changes in hydraulic pressure in the hydraulic brake actuation device when an actuator such as a lever is moved. Bicycle typically include a front braking system to apply a braking force to the front wheel and a rear braking system to apply a braking force to the rear wheel.

A hydraulic brake actuation device typically has a housing mounted to the bicycle handlebar. The housing includes a master cylinder, a master piston disposed in the master cylinder and an actuation lever pivotally supported on the housing. The housing includes a master cylinder bore with a master piston slidably disposed in the master cylinder bore. By pivoting the actuation lever, the master piston is moved in the master cylinder bore via push rod. Typically, the lever moves the push rod along a linear path. The push rod is often supported by grooves in the housing. The movement of the master piston increases the hydraulic pressure in the brake system such that a slave piston in the caliper is moved. This movement of the slave piston in the caliper causes the brake pads to move together to squeeze the rotor. Some hydraulic brake actuation devices are provided with adjustments for controlling the resting position of the lever to adjust the reach of the lever.

Typically, when the actuation lever of the hydraulic brake actuation device is moved, the slave cylinder(s) also move a corresponding amount. Thus, when the actuation lever of the hydraulic brake actuation device is initially moved, braking contact is delayed because the brake pads must first move and close the gap between the brake pads and the braking surfaces of the rotor. The movement of the brake pads typically corresponds directly movement of the lever arm in a movement ratio. Specifically, for each angular degree of movement of the lever arm, there is a corresponding movement of the brake pads. To control the braking action, some hydraulic braking systems have been provided with an adjustment mechanism for controlling a free stroke of the master piston.

SUMMARY

One aspect is to provide a hydraulic brake actuation device that has a replaceable support member that controls the movement of a push rod.

Another aspect is to provide a hydraulic brake actuation device that has a support member that controls the movement of a push rod along a non-linear path.

Still another aspect is to provide a hydraulic brake actuation device that is relatively lightweight and that can be manufactured at a relatively reasonable cost.

In view of the state of the known technology, a hydraulic brake actuation device is disclosed therein that basically comprises a housing, a master piston, a push rod, an actuation lever, a contact member and a support member. The housing includes a master cylinder. The master piston is slidably disposed in the master cylinder. The push rod is coupled to the master piston. The actuation lever is pivotally attached to the housing. The contact member contacts the actuation lever. The contact member also contacts the push rod that pushes the master piston. The support member is attached to the housing. The support member is a separate piece from the housing that guides the contact member.

These and other objects, features, aspects and advantages of the disclosed hydraulic brake actuation device will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1 to 4, a hydraulic brake actuation device 10 is illustrated in accordance with one illustrated embodiment. The hydraulic brake actuation device 10 is typically mounted to a handlebar 12 of a bicycle (not shown). The hydraulic brake actuation device 10 basically includes a housing 14, a master piston 16, an actuation lever 18 and a push rod assembly 20.

Figure 5:
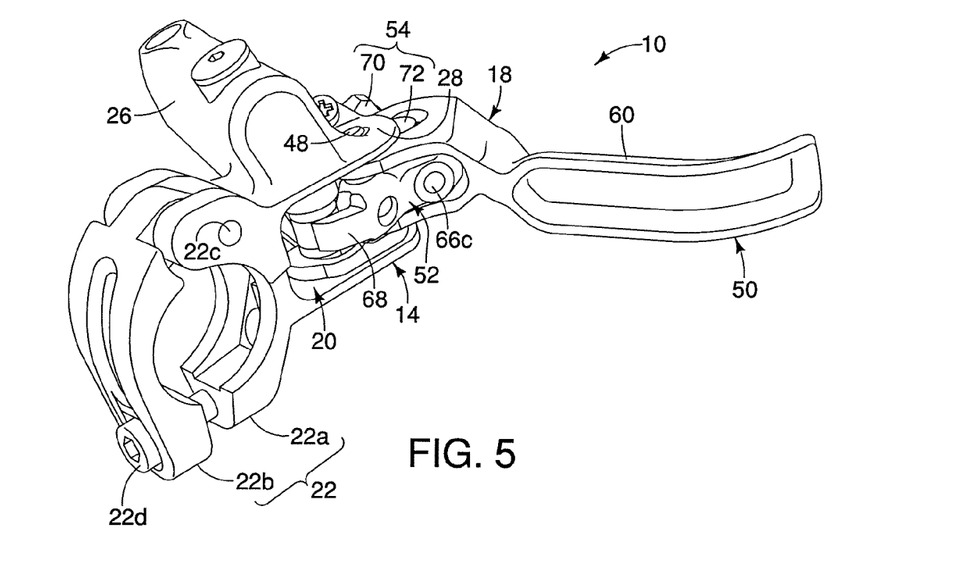
FIG. 5 is a perspective view of the hydraulic brake actuation device illustrated in FIGS. 1 to 4.
Figure 6:
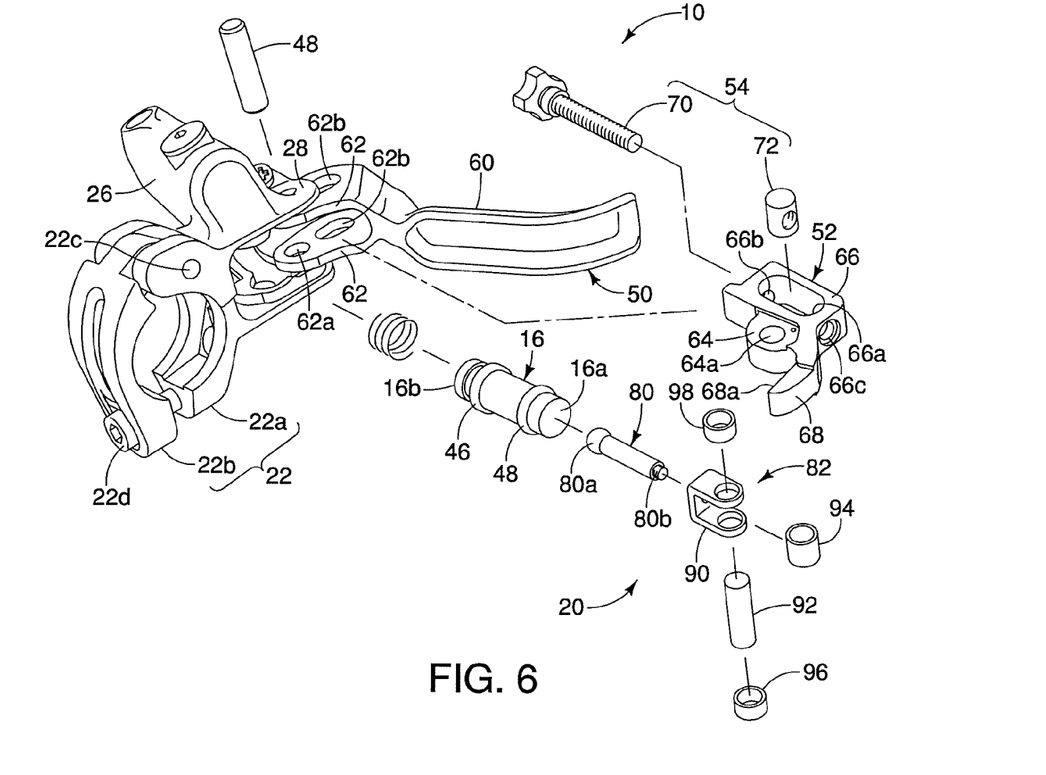
FIG. 6 is an exploded perspective view of the hydraulic brake actuation device illustrated in FIGS. 1 to 5 with selected parts exploded from the housing.
Figure 7:
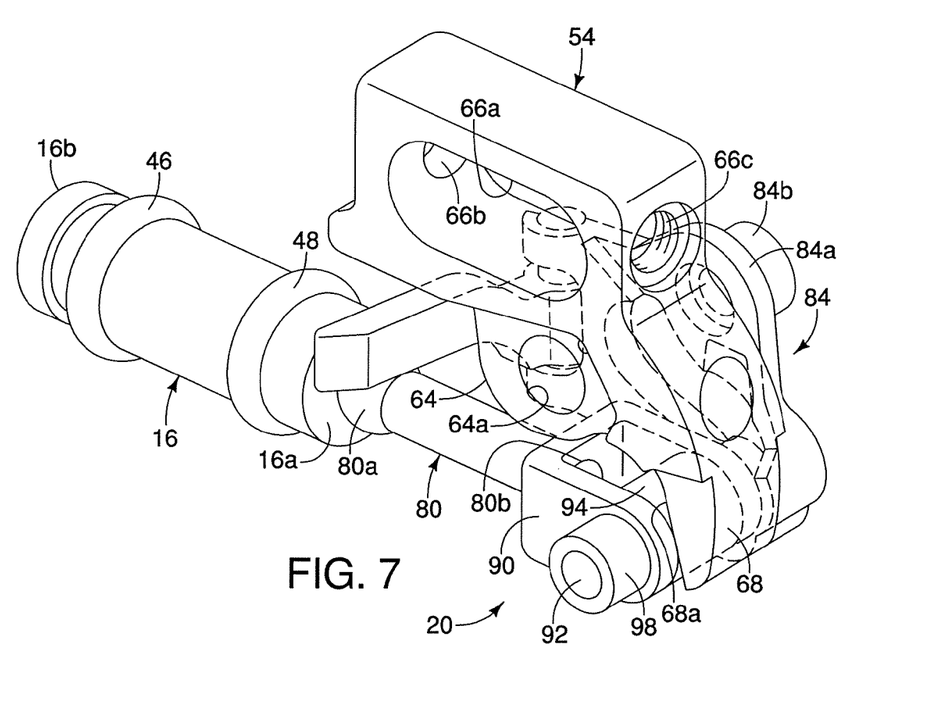
FIG. 7 is a perspective view of selected parts of the hydraulic brake actuation device illustrated in FIGS. 1 to 6.
Figure 8:
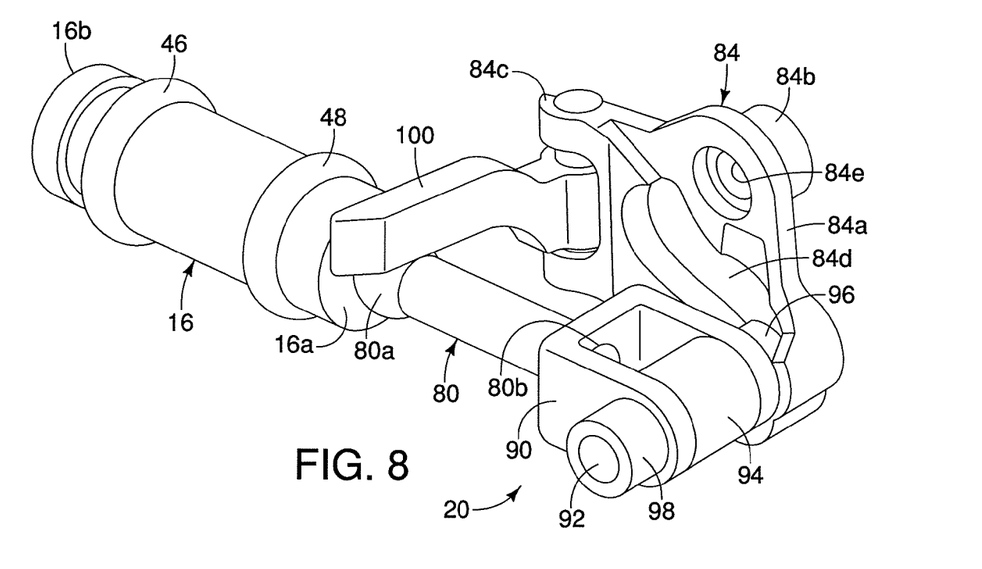
FIG. 8 is a perspective view of selected parts of the hydraulic brake actuation device illustrated in FIGS. 1 to 7.
Figure 9:
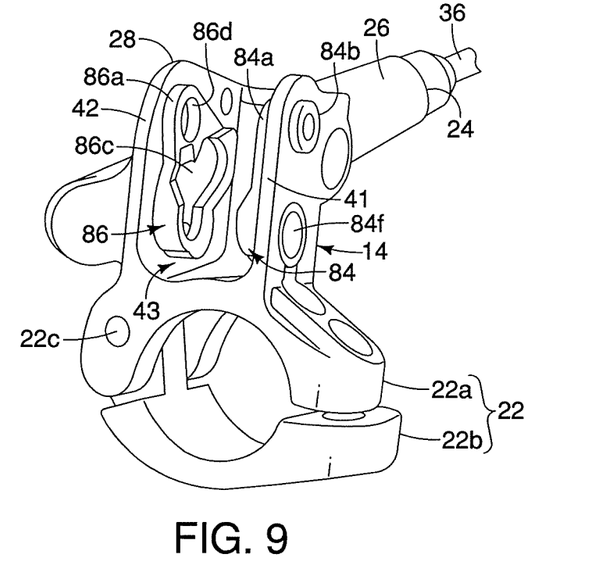
FIG. 9 is a perspective view of the housing and the support members of the hydraulic brake actuation device illustrated in FIGS. 1 to 7.
Figure 10:
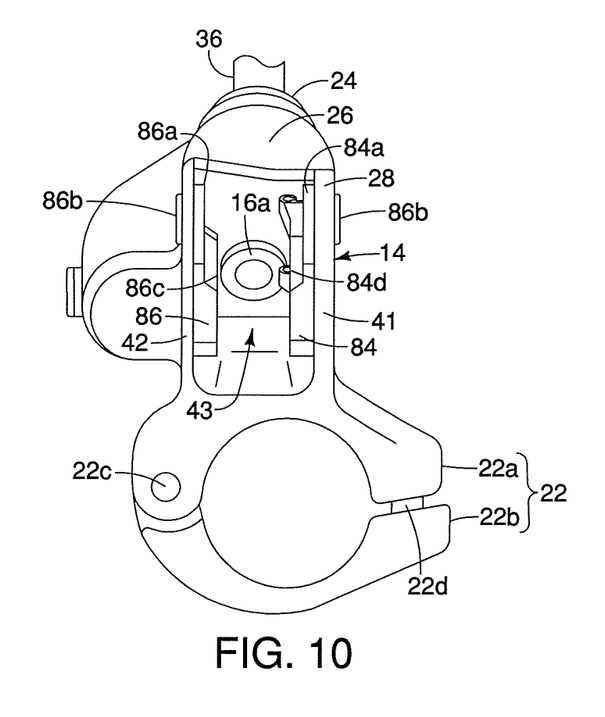
FIG. 10 is an end elevational view of the housing and the support members of the hydraulic brake actuation device illustrated in FIGS. 1 to 7.

As best shown in FIGS. 1 to 4, the housing 14 basically includes a handlebar attachment portion 22, a hydraulic line attachment portion 24, a master cylinder 26 and a lever supporting portion 28. In this illustrated embodiment, as best seen in FIGS. 5 and 6, the handlebar attachment portion 22 is a conventional band clamp with a first clamping portion 22a and a clamping second portion 22b. The first clamping portion 22a is integrally formed with the hydraulic line attachment portion 24, the master cylinder 26 and the lever supporting portion 28. The clamping second portion 22b is pivotally attached to the first portion 22a by a pivot pin 22c. A fastener 22d is provided to tighten the first and second clamping portions 22a and 22b on the handlebar 12.

Figure 1:
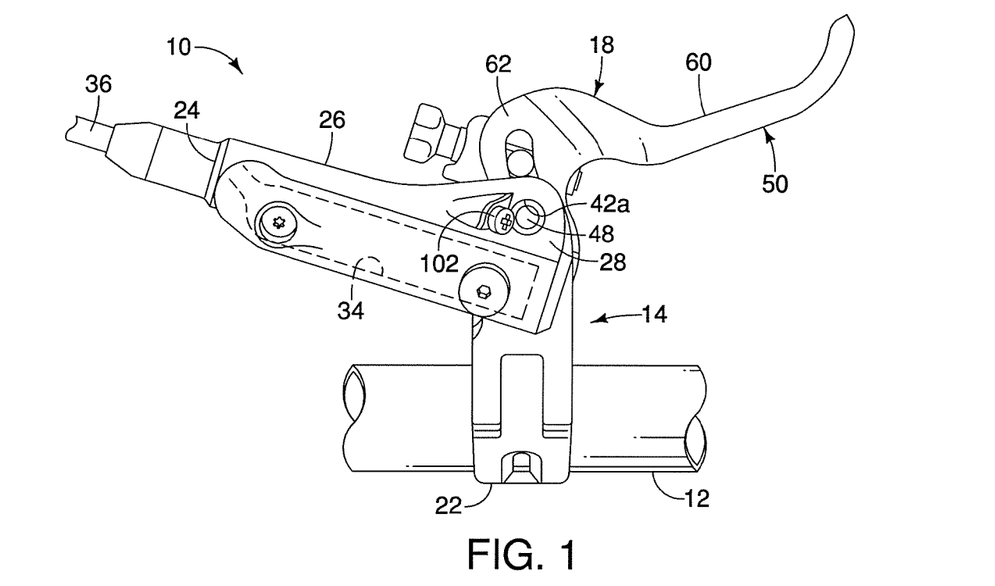
FIG. 1 is a top plan view of a hydraulic brake actuation device in accordance with one illustrated embodiment with the actuation lever in a lever resting position.
Figure 2:
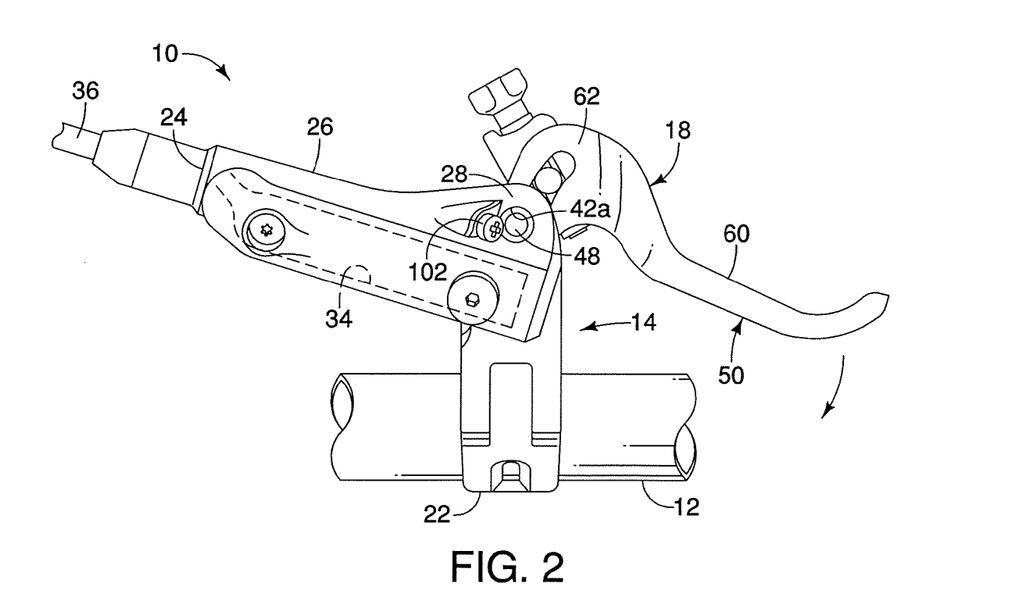
FIG. 2 is a top plan view of the hydraulic brake actuation device illustrated in FIG. 1 with the actuation lever in a lever braking position.
Figure 3:
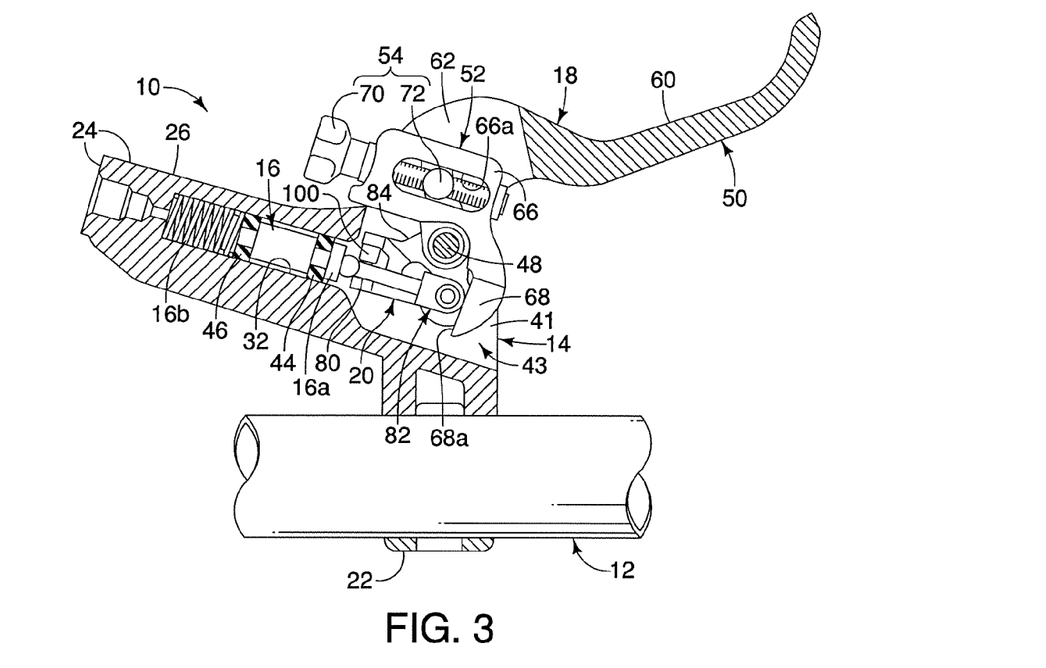
FIG. 3 is a partial cross sectional view of the hydraulic brake actuation device illustrated in FIGS. 1 and 2 with the actuation lever in the lever resting position.
Figure 4:
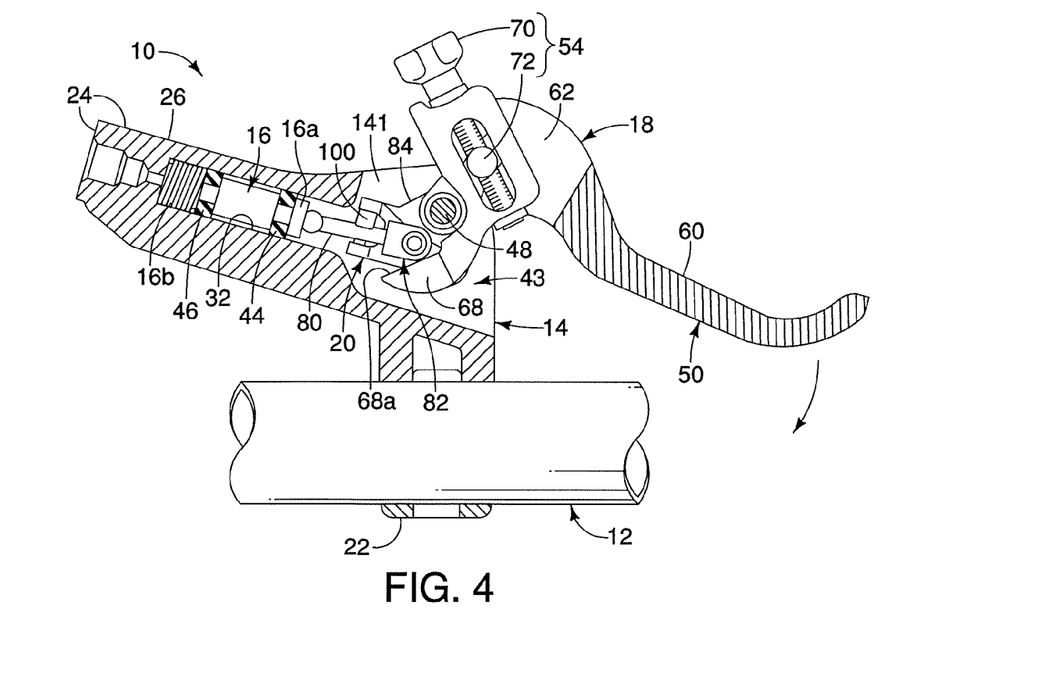
FIG. 4 is a partial cross sectional view of the hydraulic brake actuation device illustrated in FIGS. 1 to 3 with the actuation lever in the lever braking position.

As best shown in FIGS. 3 and 4, the master cylinder 26 includes a cylinder bore 32 that receives the master piston 16 in a slidable manner. As best shown in FIGS. 1 and 2, a brake fluid reservoir 34 is provided in the housing 14. The brake fluid reservoir 34 is in fluid communication with the cylinder bore 32 in a conventional manner. The hydraulic line attachment portion 24 is configured and dimensioned to be connected to a hydraulic line 36 in a conventional manner. The lever supporting portion 28 is defined by two opposed side walls 41 and 42 that defines a recess 43. The recess 43 houses the push rod assembly 20.

As seen in FIGS. 3 and 4, the master piston 16 is slidably disposed in the cylinder bore 32 of the master cylinder 26 to move between a piston neutral position and a piston braking position. Movement of the master piston 16 causes corresponding movement of a slave piston in a brake caliper (not shown) in accordance with corresponding increases in the fluid pressure within the master cylinder 26. The master piston 16 is a generally cylindrical member that has a first end 16a and a second end 16b. The master piston 16 is provided with a pair of rubber seals 44 and 46 between the first and second ends 16a and 16b. The seals 44 and 46 are radial seals that are located in annular recesses of the master piston 16. The seals 44 and 46 extend around the outer circumference of the master piston 16 and contact that the surface of the cylinder bore 32 of the master cylinder 26. The seals 44 and 46 create a fluid seal between the cylinder bore 32 and the master piston 16. The first end 16a of the master piston 16 has a concaved surface that receives a part of the push rod assembly 20 as discussed below.

Figure 11:
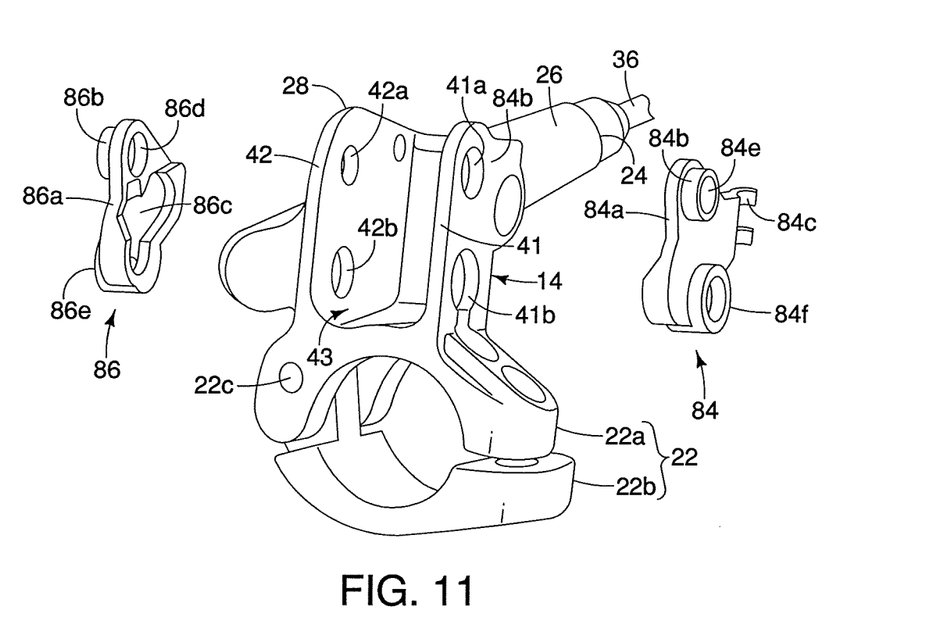
FIG. 11 is a perspective view of the housing with exploded from the support members.
Figure 12:
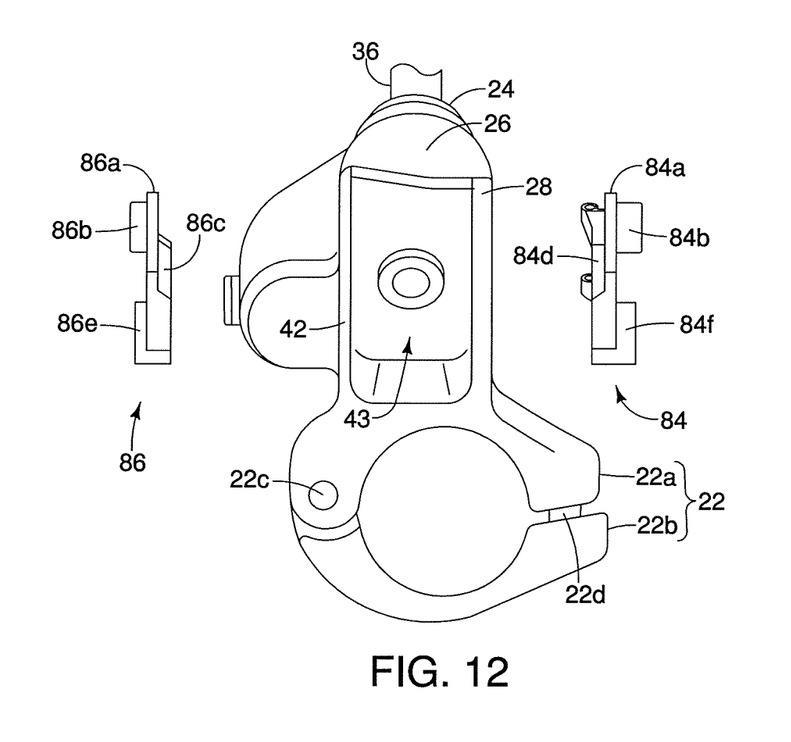
FIG. 12 is an end elevational view of the housing with exploded from the support member.
Figure 13:
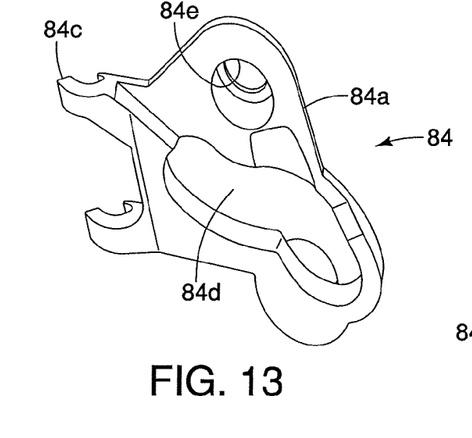
FIG. 13 is a perspective view of a first side of the first (lower) support member of the hydraulic brake actuation device illustrated in FIGS. 1 to 7.
Figure 14:
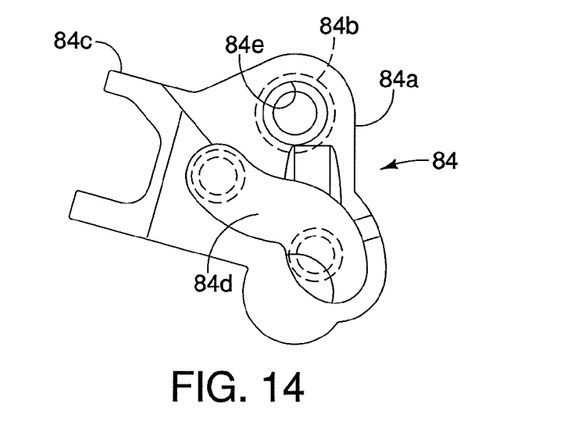
FIG. 14 is a side elevational view of the first side of first (lower) support member illustrated in FIG. 13.
Figure 15:
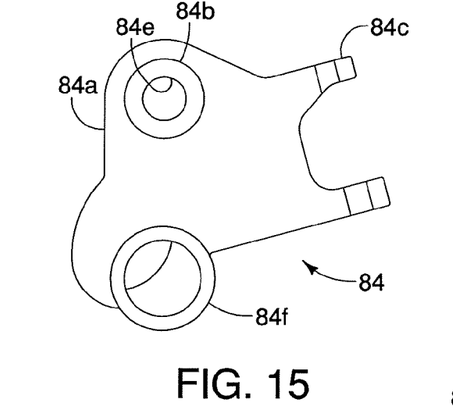
FIG. 15 is a side elevational view of a first second of the first (lower) support member illustrated in FIGS. 13 and 14.
Figure 16:
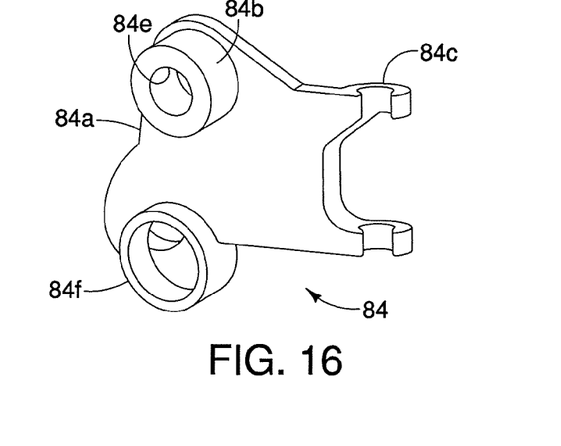
FIG. 16 is a perspective view of the second side of the first (lower) support member illustrated in FIGS. 13 to 15.
Figure 17:
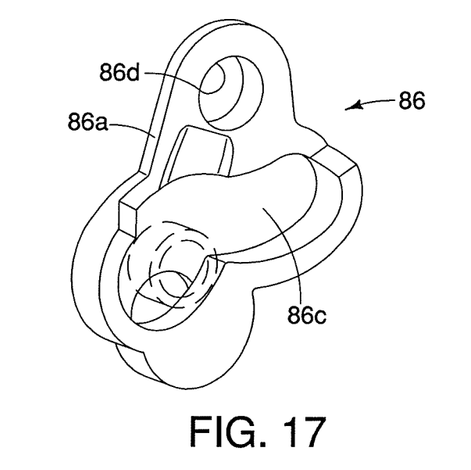
FIG. 17 is a perspective view of a first side of the second (upper) support member of the hydraulic brake actuation device illustrated in FIGS. 1 to 7.
Figure 18:
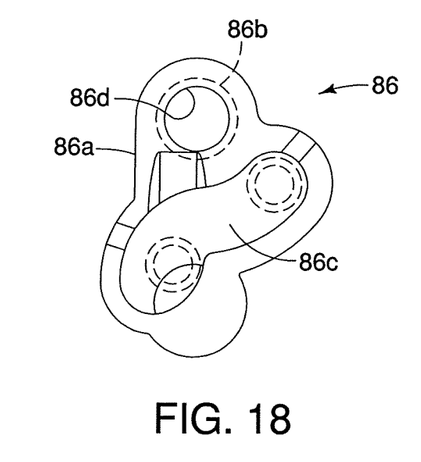
FIG. 18 is a side elevational view of the first side of second (upper) support member illustrated in FIG. 17.
Figure 19:
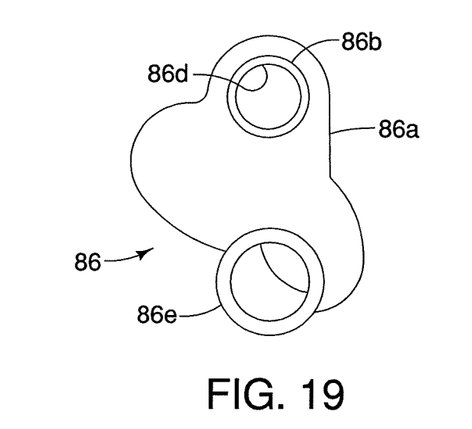
FIG. 19 is a side elevational view of a second of the second (upper) support member illustrated in FIGS. 17 and 18.
Figure 20:
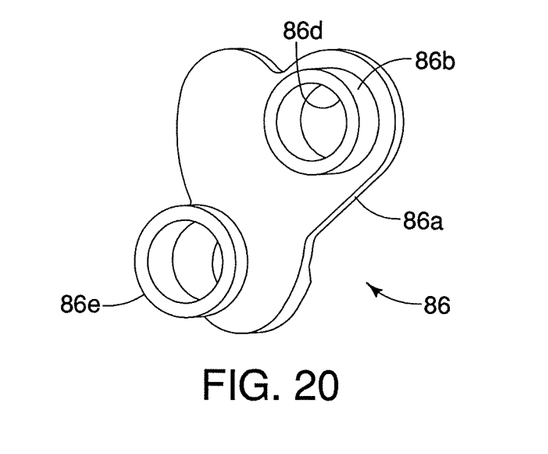
FIG. 20 is a perspective view of the second side of the second (upper) support member illustrated in FIGS. 17 to 19.

As seen in FIGS. 3 and 4, the actuation lever 18 is pivotally attached to the housing 14 by a pivot pin 48 for movement between a lever resting position (FIG. 3) and a lever braking position (FIG. 4). In particular, the side walls 41 and 42 of the housing 14 have pivot holes 41a and 42a (FIG. 11), respectively, which receives the pivot pin 48 for pivotally attaching the actuation lever 18 to the housing 14. The actuation lever 18 is operatively coupled to the push rod assembly 20, which in turn is operatively coupled to the master piston 16. During a braking operation, the actuation lever 18 pivots on the pivot pin 48 from the lever resting position to the lever braking position to move to move the master piston 16 in the cylinder bore 32 from the piston neutral position to the piston braking position. In particular, the push rod assembly 20 is pushed by the actuation lever 18 which in turn moves the master piston 16 in the cylinder bore 32 from the piston neutral position to the piston braking position.

Basically, the actuation lever 18 includes a user operating part 50, an actuation part 52 and a reach adjustment part 54. The actuation part 52 is fixed to the user operating part 50 by the reach adjustment part 54, such that the actuation part 52 rotates with the user operating part 50. The reach adjustment part 54 is adjustable to change the relative position of the user operating part 50 with respect to the actuation part 52. In other words, the reach adjustment part 54 is adjustable to change the lever resting position of the user operating part 50 of the actuation lever 18 relative to the housing 14.

The user operating part 50 is basically a lever arm that is pivotally attached to the housing 14 for pivotal movement about the pivot pin 48. The user operating part 50 includes a grip end 60 and a pair of generally parallel attachment flanges 62. The attachment flanges 62 extends from the grip end 60 and receives the actuation part 52 therebetween. Each of the attachment flanges 62 is provided with an aperture 62a for receiving the pivot pin 48. Each of the attachment flanges 62 is further provided with an elongated opening 62b, which receives the reach adjustment part 54.

The actuation part 52 is basically a block member that is pivotally attached to the housing 14 for pivotal movement about the pivot pin 48. The actuation part 52 includes a mounting portion 64, a block portion 66 and a cam protrusion 68. The mounting portion 64 has an aperture 64a for receiving the pivot pin 48. The block portion 66 supports the reach adjustment part 54. In particular, the block portion 66 is provided with an elongated slot 66a, an unthreaded bore 66b and a threaded bore 66c for adjustably supporting the reach adjustment part 54 as discussed below. The cam protrusion 68 is provided with a cam surface 68a that contacts the push rod assembly 20 during a braking operation. In particular, during a braking operation, the push rod assembly 20 is pushed by the cam protrusion 68 of the actuation lever 18 which in turn moves the master piston 16 in the cylinder bore 32 from the piston neutral position to the piston braking position.

The reach adjustment part 54 provides a reach adjustment feature to adjust the lever resting position of the user operating part 50. The reach adjustment part 54 basically includes an adjustment bolt 70 and a trunnion 72. The shaft of the adjustment bolt 70 extends through the unthreaded bore 66b of the actuation part 52 and is threaded into the threaded bore 66c of the actuation part 52. The trunnion 72 has a threaded hole 72a that is threadedly engaged with the shaft of the adjustment bolt 70. The trunnion 72 is disposed in the elongated openings 62b of the user operating part 50 and the elongated slot 66a of the actuation part 52 to adjust an orientation of the user operating part 50 relative to the actuation part 52. By rotating the adjustment bolt 70, the trunnion 72 moves along the shaft of the adjustment bolt 70 within the elongated slot 66a of the actuation part 52. This movement of the trunnion 72 pivots the user operating part 50 with respect to the actuation part 52. In this way, the user operating part 50 is adjustable arranged between a plurality of orientations with respect to the actuation part 52 and the housing 14.

As seen in FIGS. 5 and 6, the push rod assembly 20 is located in the recess 43 that is located between the opposed side walls 41 and 42. The push rod assembly 20 is operatively coupled between the actuation lever 18 and the master piston 16 to move the master piston 16 between the piston neutral position and the piston braking position in response to movement of the actuation lever 18 between the resting position and the lever braking position. The push rod assembly 20 basically includes a push rod 80, a contact member 82 and a pair of support members 84 and 86.

As seen in FIG. 5, the push rod 80 is operatively coupled between the master piston 16 and the contact member 82. The push rod 80 is a rigid member that has a first end 80a and a second end 80b. The first end 80a is arranged to push the master piston 16, while the second end 80b is arranged to receive an actuation force from the actuation lever 18 via contact member 82. In the illustrated embodiment, the first end 80a of the push rod 80 has a spherical contact surface that directly contacts the concaved surface of the second end 16b of the master piston 16. The hydraulic fluid in the master cylinder 26 holds the master piston 16 in the piston neutral position, which in turn holds the push rod 80, the contact member 82 and the actuation lever 18 in each of their resting positions.

In the illustrated embodiment, the contact member 82 includes a push rod attachment structure 90, a roller axle 92, a cam roller 94 and a pair of support rollers 96 and 98. Basically, the contact member 82 is movably supported in the recess 43 of the housing 14 by the support members 84 and 86. As explained below, during a braking operation, the contact member 82 moves along a non-linear path provided by the support members 84 and 86 in response to the actuation lever 18 being actuated from the resting position to the braking position. In other words, the actuation lever 18 contacts the contact member 82 to move the contact member 82 along a non-linear path provided by the support members 84 and 86. This movement of the contact member 82 also results in movement of the master piston 16.

The push rod attachment structure 90 is generally a U-shaped member that constitutes a roller cage. The push rod attachment structure 90 is fixedly attached to the second end 80b of the push rod 80. For example, as in the illustrated embodiment, the second end 80b of the push rod 80 has an external thread that is threaded into a threaded hole in the central portion of the push rod attachment structure 90. The push rod attachment structure 90 supports the roller axle 92 with the cam roller 94 and the support rollers 96 and 98 being rotatably mounted on the roller axle 92. In other words, the roller axle 92 defines a roller rotational axis for the cam roller 94 and the support rollers 96 and 98.

In the illustrated embodiment, the push rod attachment structure 90 has through holes for receiving the roller axle 92. The roller axle 92 extends through the holes in both axial directions. Thus, the roller axle 92 extends from the push rod attachment structure 90 in both axle directions to form a pair of extended portions. These extended portions of the roller axle 92 support the support rollers 96 and 98, respectively. The cam roller 94 is axially rotatable on the push rod attachment structure 90 via the roller axle 92 between the support rollers 96 and 98. In this way, the support rollers 96 and 98 are rotatably mounted on opposite sides of the push rod attachment structure 90 on the roller axle 92.

Preferably, the cam surface 68a of the cam protrusion 68 directly contacts the cam roller 94 while the actuation lever 18 is in the resting position. In any event, in the illustrated embodiment, the cam roller 94 is at least directly contacted by the cam surface 68a of the cam protrusion 68 of the actuation lever 18 during a braking operation. As the cam surface 68a of the cam protrusion 68 contacts the cam roller 94 during a braking operation, the cam roller 94 rotates and rides along the cam surface 68a of the cam protrusion 68. At the same time the support rollers 96 and 98 also rotate and ride along the support rollers 96 and 98 as discussed below.

As seen in FIGS. 9 to 12, in the illustrated embodiment, the support members 84 and 86 are replaceably mounted to the housing 14. Thus, the support members 84 and 86 are each a separate piece from the housing 14 that guides the contact member 82. The support members 84 and 86 are formed of a material that is different from a primary material of the housing 14. For example, typically, the housing 14 is primarily made of case aluminum. Thus, the can be made of a non-metallic material or a metallic material with different properties that the housing 14. Also in the illustrated embodiment, the support member 84 holds an adjustment guide body 100 that adjusts or sets a starting position for the stroke of the master piston 16.

The support member 84 includes a body portion 84a that has a mounting projection 84b projecting from one side of the body portion 84a. The mounting projection 84b is disposed in the pivot hole 41a (FIG. 11) of the housing 14. The pivot hole 41a constitutes a mating depression of the housing 14 for receiving the mounting projection 84b. Thus, the support member 84 mates with the pivot hole 41a (i.e., a corresponding portion of the housing 14) to form a mating arrangement that releasably retains the support member 84 to the housing 14.

The support member 84 also includes a pair of hooks 84c that holds the adjustment guide body 100 for pivotal movement. An adjustment screw 102 is threaded into the side wall 42 of the housing with the tip of the adjustment screw 102 contacting the adjustment guide body 100 for adjusting the position of the adjustment guide body 100. This adjustment feature is optional, and can be eliminated if needed and/or desired.

A roller receiving groove 84d is provided on the side of the support member 84 that is opposite to the mounting projection 84b. The roller receiving groove 84d supports and guides the support roller 96 for movement along the roller receiving groove 84d, as the push rod 80 moves the master piston 16 between the piston neutral position and the piston braking position. The roller receiving groove 84d of the support member 84 is a non-linear groove such that the support roller 96 is rotatably and movably supported by the roller receiving groove 84d along a non-linear path.

In the illustrated embodiment, the support member 84 has an opening 84e that receives the pivot pin 48 that pivotally supports the actuation lever 18 to the housing 14. The opening 84e extends axially through the mounting projection 84b in the illustrated embodiment. However, the opening 84e of the support member 84 does not need to extend through the mounting projection 84b. In other words, a different mating arrangement can be provided as needed and/or desired. For example, the support member 84 is also provided with a mounting projection 84f that projects from one side of the body portion 84*a*. The mounting projection 84*f* is disposed in the pivot hole 41*b* (FIG. 11) of the housing 14.

The support member 86 includes a body portion 86*a* that has a mounting projection 86*b* projecting from one side of the body portion 86*a*. The mounting projection 86*b* is disposed in the pivot hole 42*a* (FIG. 11) of the housing 14. The pivot hole 42*a* constitutes a mating depression of the housing 14 for receiving the mounting projection 86*b*. Thus, the support member 86 mates with the pivot hole 42*a* (i.e., a corresponding portion of the housing 14) to form a mating arrangement that releasably retains the support member 86 to the housing 14.

The support member 86 also includes a roller receiving groove 86*c* is provided on the side of the support member 86 that is opposite to the mounting projection 86*b*. The roller receiving groove 86*c* supports and guides the support roller 98 for movement along the roller receiving groove 86*c*, as the push rod 80 moves the master piston 16 between the piston neutral position and the piston braking position. The roller receiving groove 86*c* of the support member 86 is a non-linear groove such that the support roller 98 is rotatably and movably supported by the roller receiving groove 86*c* along a non-linear path.

In the illustrated embodiment, the support member 86 has an opening 86*d* that receives the pivot pin 48 that pivotally supports the actuation lever 18 to the housing 14. The opening 86*d* extends axially through the mounting projection 86*b* in the illustrated embodiment. However, the opening 86*d* of the support member 86 does not need to extend through the mounting projection 86*b*. In other words, a different mating arrangement can be provided as needed and/or desired. For example, the support member 86 is also provided with a mounting projection 86*e* that projects from one side of the body portion 86*a*. The mounting projection 86*e* is disposed in the pivot hole 42*b* (FIG. 11) of the housing 14.

In the illustrated embodiment, each of the roller receiving grooves 84*d* and 86*c* constitutes a contact member receiving guide that is a non-linear guide. Also, since the roller receiving grooves 84*d* and 86*c* support and guide the support rollers 96 and 98, respectively, each of the roller receiving grooves 84*d* and 86*c* also constitutes a roller guide.

By using replaceable support members 84 and 86, the user can easily change the stroke characteristics of the hydraulic brake actuation device 10. Also the user can easily fix the hydraulic brake actuation device 10 in the event one of the roller receiving grooves 84*d* and 86*c* becomes damaged.

Figure 21:
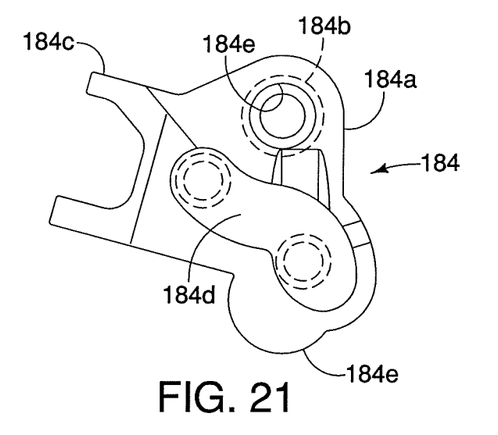
FIG. 21 is a side elevational view of a first (lower) support member in accordance with an alternative configuration.

Referring to FIG. 21, a first (lower) support member 184 is illustrated in accordance with an alternative configuration. In this alternative configuration, the support member 184 includes a body portion 184*a* with a mounting projection 184*b*, a pair of hooks 184*c* and a roller receiving opening 184*d*. Thus, this alternative configuration is identical to the prior configuration, except that the contact member receiving guide of the support member 184 is formed by the roller receiving opening 184*d* instead of grooves. Similar to the prior configuration, the mounting projection 184*b* has an opening 184*e* that receives the pivot pin 48 that pivotally supports the actuation lever 18 to the housing 14. Also, the support member 84 is also provided with a mounting projection 84*f* that is disposed in the pivot hole 41*b* (FIG. 11) of the housing 14. Here, the contact member receiving guide includes at least one guide opening.

Figure 22:
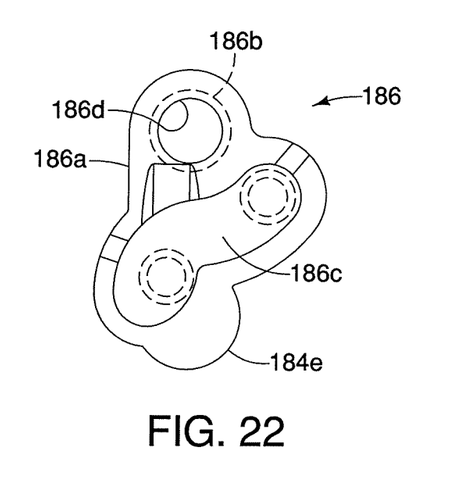
FIG. 22 is a side elevational view of a second (upper) support member in accordance with an alternative configuration.

Referring to FIG. 22, a second (upper) support member 186 is illustrated in accordance with an alternative configuration. In this alternative configuration, the support member 186 includes a body portion 186*a* with a mounting projection 186*b* and a roller receiving opening 186*c*. Thus, this alternative configuration is identical to the prior configuration, except that the contact member receiving guide of the support member 186 is formed by the roller receiving opening 186*c* instead of grooves. Similar to the prior configuration, the mounting projection 186*b* has an opening 186*d* that receives the pivot pin 48 that pivotally supports the actuation lever 18 to the housing 14. Also, the support member 186 is also provided with a mounting projection 186*e* that is disposed in the pivot hole 42*b* (FIG. 11) of the housing 14.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the hydraulic brake actuation device. Accordingly, these terms, as utilized to describe the hydraulic brake actuation device should be interpreted relative to a bicycle equipped with the hydraulic brake actuation device as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A hydraulic brake actuation device comprising:
   a housing including a master cylinder, the housing including a pair of opposed side walls that defines a recess;
   a master piston slidably disposed in the master cylinder;
   a push rod coupled to the master piston;
   an actuation lever pivotally attached to the housing;

a contact member housed in the recess and contacting the actuation lever, the contact member also contacting the push rod that pushes the master piston; and a support member configured and arranged to guide the contact member, the support member including two separate support member pieces that are separate from the housing, the two support member pieces being attached to the opposed side walls of the housing such that the support member pieces are separated from each other across the recess.

2. The hydraulic brake actuation device according to claim 1, wherein
the support member further includes a contact member receiving guide.

3. The hydraulic brake actuation device according to claim 2, wherein
the contact member receiving guide includes at least one guide groove.

4. The hydraulic brake actuation device according to claim 2, wherein
the contact member receiving guide includes at least one guide opening.

5. A hydraulic brake actuation device comprising:
a housing including a master cylinder;
a master piston slidably disposed in the master cylinder;
a rush rod coupled to the master piston;
an actuation lever pivotally attached to the housing;
a contact member contacting the actuation lever, the contact member also contacting the push rod that pushes the master piston; and
a support member attached to the housing, the support member being a separate piece from the housing, the support member including a contact member receiving guide having at least one non-linear guide that guides the contact member.

6. The hydraulic brake actuation device according to claim 2, wherein
the contact member receiving guide includes at least one a roller guide.

7. The hydraulic brake actuation device according to claim 6, wherein
the contact member includes at least one roller which be guided by the at least one roller guide.

8. The hydraulic brake actuation device according to claim 7, wherein
the support member mates with a corresponding portion of the housing to form a mating arrangement that releasably retains the support member to the housing.

9. The hydraulic brake actuation device according to claim 1, wherein
the support member includes a mounting projection that is disposed in a mating depression of the housing.

10. The hydraulic brake actuation device according to claim 1, wherein
the support member are formed of a material that is different from a primary material of the housing.

11. A hydraulic brake actuation device comprising:
a housing including a master cylinder;
a master piston slidably disposed in the master cylinder;
a push rod coupled to the master piston;
an actuation lever pivotally attached to the housing;
a contact member contacting the actuation lever, the contact member also contacting the push rod that pushes the master piston, the contact member including at least one roller; and
a support member attached to the housing, the support member being a separate piece from the housing, the support member including a contact member receiving guide that guides the contact member,
the contact member receiving guide including at least one roller guide configured and arranged to guide the at least one roller, the at least one roller guide being a non-linear groove such that the at least one roller is rotatably and movably supported by the non-linear groove along a non-linear path.

* * * * *